PATENTED
FEB 18 1868

A. S. Whittemore, Grain Thresher.

No. 74650

Witnesses:
W. C. Ashkettle
Theo. Tusche

Inventor:
A. S. Whittemore
per Munn & Co.
Attorneys

United States Patent Office.

A. S. WHITTEMORE, OF WILLIMANTIC, CONNECTICUT.

*Letters Patent No. 74,650, dated February 18, 1868.*

IMPROVEMENT IN GRAIN-THRESHERS.

The Schedule referred to in these Letters Patent and making part of the same.

TO ALL WHOM IT MAY CONCERN:

Be it known that I, A. S. WHITTEMORE, of Willimantic, in the county of Windham, and State of Connecticut, have invented a new and improved Grain-Thresher; and do hereby declare that the following is a full, clear, and exact description thereof, which will enable those skilled in the art to make and use the same, reference being had to the accompanying drawings forming part of this specification.

This invention relates to a new and improved method of constructing machinery for the threshing of grain by hand or other power, whereby the same is more effectually done without unbinding the bundles, and whereby, also, the straw is left in better condition.

It consists of a box-frame, through which are longitudinal parallel wires, on which the grain is received when threshed. It consists, also, of arms, attached to an axle rotating in suitable bearings on said frame, between each pair of which said arms, and to the end of the same, are pivoted by one and any convenient number of flails, motion being given to said axle by the hand or power working upon the same through a belt or belts, whereby the bundles of grain are threshed, the grain being separated from the straw, and, falling upon said wires, is deposited in some convenient receptacle therefor beneath the same. In the accompanying plate of drawings—

Figure 1:
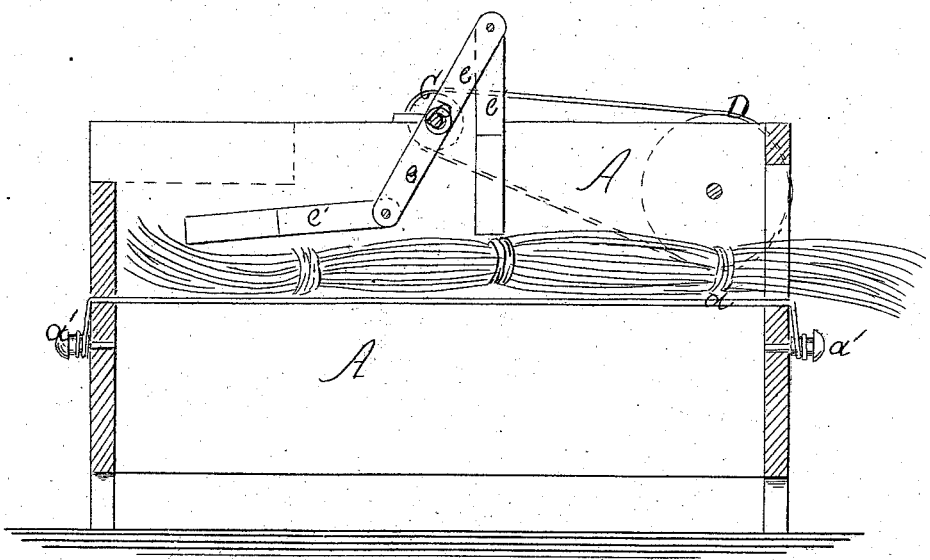
Figure 1 is a central vertical sectional view of my invention, taken in the line $x\,x$, fig. 2.
Figure 2:
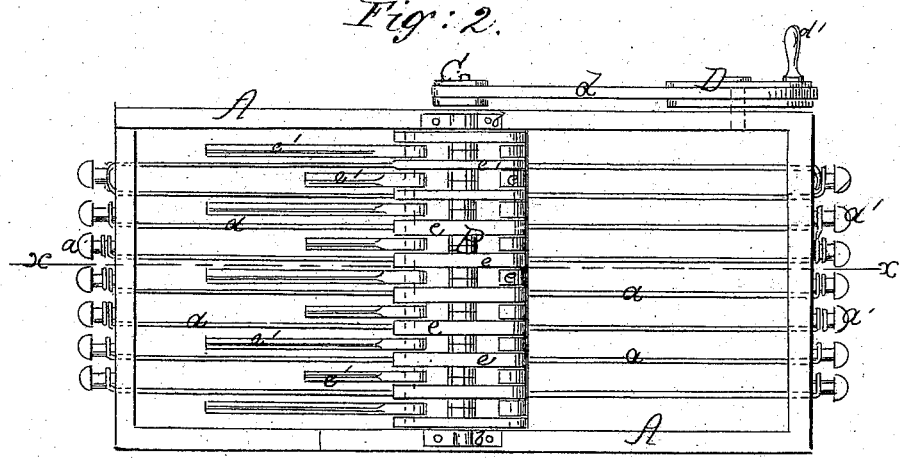
Figure 2 is a plan view of the same.

A is the box or frame; $a$ are wires through the same; $a'$ are screws, to which the wires $a$ are attached. B is an axle or shaft; $b$ are boxes or bearings, on frame A, in which the axle B rotates; $e$ are the arms on axle B; $e'$ are flails pivoted to the same. C is a pulley on axle B. D is a wheel on frame A; $d$ is a belt; $d'$ is a crank in wheel D. The bundles of grain are shown in the drawing in red. The frame A is made of wood, in the form of a rectangular box, composed of two ends and two sides, secured together in the ordinary way, supported by suitable feet. The frame A is of such length and width as to receive the quantity of grain to be at one time threshed, and to allow the flails $e'$, attached to the end of the arms $e$, to revolve about the centre of the axle B within the same. Through holes in the end of the said frame A, nearly equidistant from the top and the bottom of same, and passing longitudinally through from one end of the frame A to the other, in lines parallel with the sides of the frame A, are the wires $a$, as shown, so as to form a convenient receptacle for the heads of grain which have been beaten off or pulled out by the flails $e'$, and so as that the grain, after being threshed out by said flails $e'$, may fall through the same. Said wires $a$ are of any convenient number, as eight, and are secured on the outside of the frame A, on the ends of the same, to the screws $a'$ set to receive said wires $a$, as shown, and so also that by turning said screws $a'$ in one direction, said wires $a$ may be tightened at pleasure. Upon the frame A, and extending across the centre of the same from one side thereof to the other, and supported by and rotating in suitable boxes $b$, is an iron axle or shaft, B. Said shaft B is of sufficient size for strength, and extends beyond the frame A on one side, so as to receive a fixed pulley, C, as shown in the drawing, by means of which said pulley C the said shaft B is rotated, as is hereinafter more fully set forth. Upon the axle B, within the frame A, and rigidly secured thereto, in the centre of said arms $e$, at equal distances apart, are any convenient number of radial arms, $e$, as ten. Said arms $e$ are made of hard wood, and may be of any convenient length, but I have found by experience the length of twenty-three inches, or thereabouts, to be the proper length, and are of sufficient thickness for strength to support the flails $e'$ while beating the grain. Said arms $e$ are so secured to the axle B as to be in the same straight line, and have pivoted between each two of the same, and on the ends thereof, by one end, the flails $e'$, and in such a way, one end of said flails being left free, that when the axle B is rapidly rotated the flails $e'$ will be carried about the same by the arms $e$, so as to strike upon or beat the grain placed across the edge of the frame A, much in the manner of a single flail when operated by the hand. To one end of the frame A, on the outside thereof, and on the same side as the pulley C, and so as to rotate upon a pivot secured to said frame, is a driving-wheel, D. Said driving-wheel D may be made of wood or other suitable material, and is provided with a handle, $d'$, secured in the same so as to form a crank, by means of which the wheel D is made to rotate by the hand. Said wheel D being connected with the pulley C by a belt, $d$, a connection may be made with gearing in the ordinary way of communicating motion from one horizontal shaft to another. Said wheel D and pulley C are to each, with respect to their several diameters, in the ratio to give the necessary speed to the shaft B and arms e attached to the same.

The operation is such that the bundles of grain to be threshed, without being untied, are laid across one side of the frame A, at right angles to the wires a, the flails set in motion by the turning of the wheel D, the grain is beaten from the same, and when all the grain has thus been beaten or threshed from the same that can be in that way, said bundles are placed again upon said frame A, across the end of the same, in a line parallel with the wires a, and the operation repeated, when the flails e', passing between the stalks of the grain, thoroughly and completely separate the kernels from the straw, leaving said straw in unbroken bundles, the kernels of grain passing through, between the wires a, into some convenient receptacle of the same.

Constructed as above described, it constitutes a cheap and durable threshing-machine, to be operated by hand or other power, the advantages of which are, that grain is more rapidly and economically threshed from the straw, without unbinding the bundles thereof, that if one of the flails strikes against any resisting foreign matter in the bundles, said flail folds back upon the arms, and does not prevent the full operation of the other flails upon the grain, and that the bundles of straw are left unbroken.

I claim as new, and desire to secure by Letters Patent—

1. The longitudinal wires a, forming the bottom of a frame of a threshing-machine, when said wires are attached at each end to screws a', whereby the tension of the wires may be regulated, substantially as described.

2. In combination with the above, I claim the shaft B, bearing arms e and pivoted flails e', the pulley C, belt d, and drive-wheels D d', all constructed, arranged, and operating as set forth.

3. I claim the threshing-machine, constructed as described, and consisting of a frame, A, having wire bottom a, screws a', shaft B, arms e, flails e', pulley C, drive-wheels D d', and belt d, all arranged and operating as described.

A. S. WHITTEMORE.

Witnesses:
J. R. ARNOLD,
A. E. PEARL.